United States Patent [19]

Adam et al.

[11] Patent Number: 5,161,512
[45] Date of Patent: Nov. 10, 1992

[54] MAGNETIC FLUID CONDITIONER

[75] Inventors: LaVern L. Adam, Cherokee Village; Harley J. Adam, Hardy, both of Ark.

[73] Assignee: AZ Industries, Incorporated, Hardy, Ark.

[21] Appl. No.: 792,718

[22] Filed: Nov. 15, 1991

[51] Int. Cl.[5] .................... F02M 33/00; F02M 25/06
[52] U.S. Cl. .................... 123/538; 123/536; 123/572; 210/222
[58] Field of Search ............... 123/536, 537, 538, 539, 123/572, 573, 574; 210/222, 695

[56] References Cited

U.S. PATENT DOCUMENTS

| | | |
|---|---|---|
| 2,652,925 | 9/1953 | Vermeiren . |
| 3,091,229 | 5/1963 | Nevin .................. 123/573 |
| 3,228,878 | 1/1966 | Moody . |
| 3,349,354 | 10/1967 | Miyata . |
| 3,989,017 | 11/1976 | Reece .................. 123/572 |
| 4,157,963 | 6/1979 | Jessop et al. . |
| 4,210,535 | 7/1980 | Risk . |
| 4,265,754 | 5/1981 | Menold . |
| 4,265,755 | 5/1981 | Zimmerman . |
| 4,308,847 | 1/1982 | Ruizzo .................. 123/573 |
| 4,367,143 | 1/1983 | Carpenter . |
| 4,372,852 | 2/1983 | Kovacs .................. 210/222 |
| 4,461,262 | 7/1984 | Chow . |
| 4,568,901 | 2/1986 | Adam .................. 123/538 |
| 4,659,479 | 4/1987 | Stickler et al. . |
| 4,711,271 | 12/1987 | Weisenbarger et al. ....... 123/538 |
| 4,746,425 | 5/1988 | Stickler et al. . |
| 4,772,387 | 9/1988 | Simoni . |
| 4,935,133 | 6/1990 | Hirama . |
| 5,055,188 | 10/1991 | Johnston et al. .................. 210/695 |
| 5,076,246 | 12/1991 | Onyszczuk .................. 123/538 |

Primary Examiner—E. Rollins Cross
Assistant Examiner—M. Macy
Attorney, Agent, or Firm—Eugene Stephens & Associates

[57] ABSTRACT

A magnetic conditioner is arranged with a plurality of magnets surrounding a central axis of a conduit. The magnets include like magnetic poles facing the conduit for concentrating magnetic energy within the conduit. The magnetic poles are also arranged in a helical pattern along the length of the conduit to expose fluid flowing through the conduit to a more uniform amount of magnetic field energy. The magnetic conditioner is also assembled as a part of an emission control system that includes a coalescing filter and a positive crankcase ventilation valve.

23 Claims, 4 Drawing Sheets

MAGNETIC FLUID CONDITIONER

TECHNICAL FIELD

Our invention relates to devices for magnetically treating fluids. Empirical effects of magnetic treatments on a variety of fluids are well known, and the treatments have proven useful for purposes ranging from inhibiting mineral deposition to enhancing combustion.

BACKGROUND

Although exact chemical mechanisms through which magnetic treatments produce changes in fluids do not appear to be completely understood, the changes are readily reproducible by known magnetic conditioning devices. Some of these devices use permanent magnets and others use electromagnets for producing magnetic fields. Conduits carry the fluids across magnetic field lines generated by the magnets. Thus, in addition to exposing the fluids to magnetic fields and thereby affecting magnetic dipoles in the fluids, the devices also provide relative motions between the fluids and magnetic fields, which induce electric fields in the fluids.

Recently, efforts have been made to increase the effectiveness of magnetic conditioning devices and to expand the kinds of benefits that can be obtained from magnetically treating fluids. For example, U.S. Pat. No. 4,659,479 to Stickler et al. discloses an electromagnetic water treating device that provides for inhibiting formation of scale and growth of algae, for eliminating taste and odor from water, and for providing corrosion protection. Improved efficiencies are obtained by circulating the water along a helical path that crosses magnetic lines of force at more points and at angles approaching ninety degrees. The helical path is defined by a baffle that also increases velocity of the water without diminishing its overall time of exposure to the magnetic fields.

Another magnetic conditioning device using a helical circulation of fluid for improving efficiencies is disclosed in U.S. Pat. No. 4,772,387 to Simoni. However, instead of using a baffle to circulate the fluid, opposite ends of Simoni's conditioner include lateral openings to induce a helical flow path with a relatively small pitch. Variations in flow rate are accommodated by selectively connecting two or more conditioners in series.

U.S. Pat. No. 4,568,901 issued to one of the inventors named jointly herein discloses an arrangement of permanent magnets that provides for focusing magnetic field energy within a conduit. The permanent magnets are encapsulated within a polypropylene casing that surrounds the conduit. Like magnetic poles of the magnets face the conduit, producing field boundaries that are concentrated within the conduit for exposing fluid flowing through the conduit to a higher amount of magnetic field energy. The arrangement of permanent magnets is particularly suitable for enhancing combustion of fuel.

SUMMARY OF INVENTION

Our invention is based on a discovery that a unique arrangement of magnets can significantly improve efficiencies of magnetic conditioning devices. The arrangement is believed to expose fluids treated by the devices to a more uniform amount of magnetic field energy.

The treated fluid is carried in a conduit having a central axis and a length that extends along the central axis. Magnets are mounted about the central axis with like magnetic poles facing toward the central axis. Opposite magnetic poles of the respective magnets are aligned with radial lines that vary angularly about the central axis along the length of the conduit.

The radial lines through the opposite magnetic poles are grouped in numbers of two or more within respective transverse planes that extend normal to the central axis at different points along the length of the conduit. Within each of the transverse planes, the radial lines are spaced at even angular intervals about the central axis. However, the equiangularly spaced magnetic poles in the respective transverse planes are angularly indexed with respect to each other along the length of the conduit.

A separate group of magnets can be used to define the opposite magnetic poles within each transverse plane, or elongated magnets can be twisted into respective helical forms that extend through the transverse planes. The opposite magnetic poles of the elongated magnets are located on radial lines that vary angularly about the central axis along the length of the conduit. Preferably, the radial lines within each transverse plane are spaced at one-hundred-twenty degree intervals about the central axis and are indexed with respect to the radial lines within other transverse planes by even amounts.

Our invention also includes a unique application of magnetic conditioning technology to automotive emission control systems. The magnetic conditioner is used in conjunction with a PCV valve and a coalescing filter for treating so-called "blow by" gases of an internal combustion engine before returning the gases to an intake manifold of the engine. The treatment includes separating contaminants from the gases and exposing the fuel to a specially arranged magnetic field to provide for more complete combustion of the gases within the engine and for a reduction in harmful emissions from the engine.

The coalescing filter is mounted within a housing that interconnects the PCV valve with the magnetic conditioner. Oil separated by the coalescing filter from the gases collects in the bottom of the housing and is drained through the PCV valve to the crankcase. An adjustment screw controls the size of the flow-restricting orifice that is used in conjunction with the PCV valve to control flow rates of the gases and to adapt the emission control system to different size engines.

DRAWINGS

DETAILED DESCRIPTION

Figure 1:
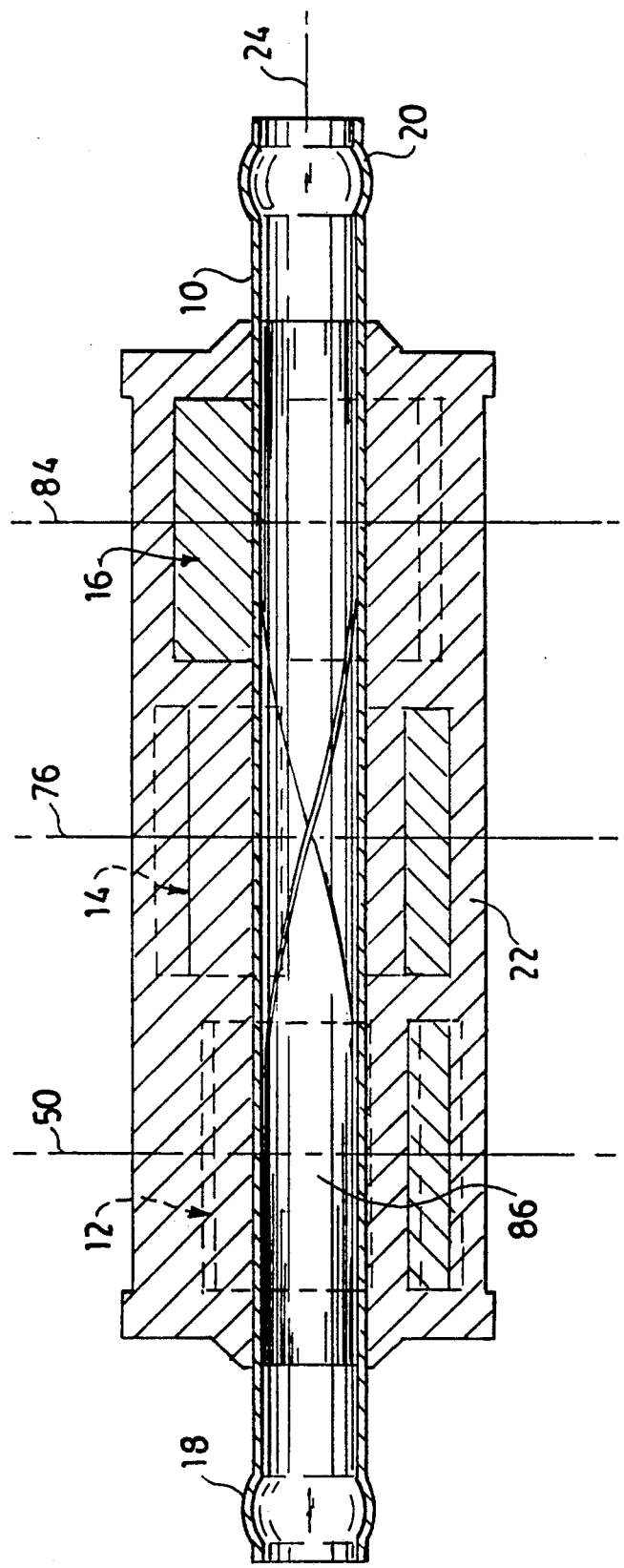
FIG. 1 is a cross-sectional view of our new magnetic conditioner showing three groups of magnets arranged in a spiral pattern about a conduit.
Figure 2:
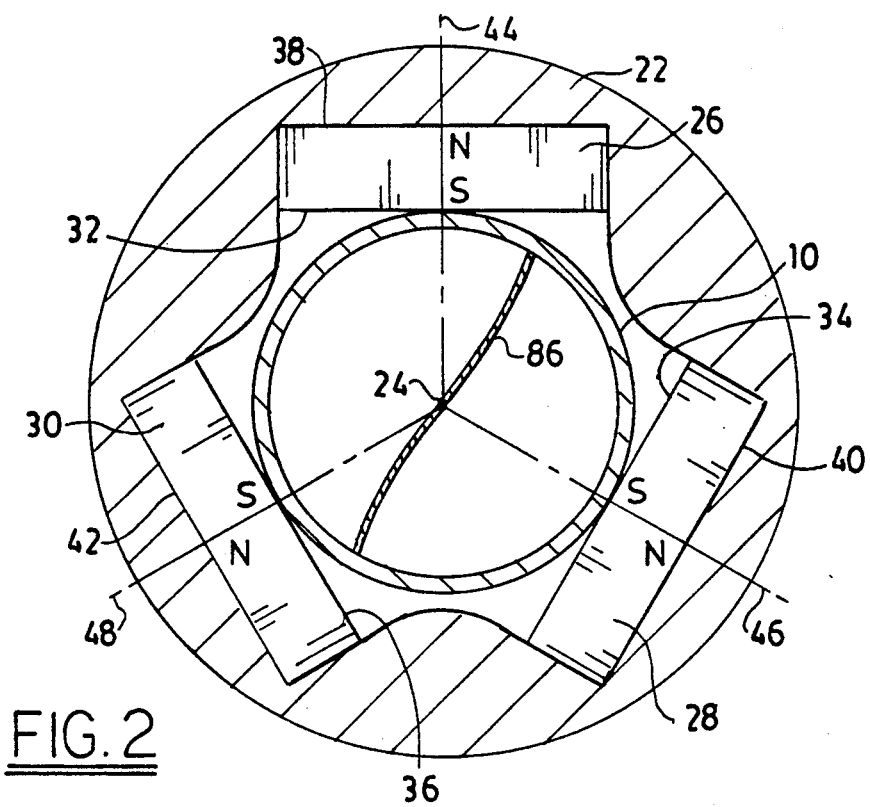
FIG. 2 is a cross-sectional view in a transverse plane through one of the groups of magnets.

One embodiment of our invention shown in FIGS. 1-5 includes a conduit 10 having a middle section surrounded by three groups of permanent magnets 12, 14, and 16 that are arranged in a helical pattern about a periphery of the conduit 10. Conventional fittings 18 and 20 are formed at opposite ends of the conduit 10 to provide connections within lines conveying fuel or other fluids that can benefit from treatment by magnetic forces. Of course, other known fittings could also be used to similarly connect the conduit 10 along a path of fluid flow.

The conduit 10 can be made of copper or other nonmagnetic materials that are permeable to magnetic fields. A central axis 24 is centered within the conduit and extends along the conduit's length. The three groups of magnets 12, 14, and 16 are encapsulated within a casing 22 that can be made of polypropylene or similar moldable dielectric materials. Each of the groups of magnets includes three bar magnets, shown for example in FIG. 2 as magnets 26, 28, and 30 of group 12.

The magnets 26, 28, and 30 include like pole faces 32, 34, and 36 located next to conduit 10 and the opposite like pole faces 38, 40, and 42 located away from the conduit. Respective north and south magnetic poles, indicated as "N" and "S", are located on radial lines 44, 46, and 48 that extend in a transverse plane 50 from the central axis 24 of the conduit. The magnets 26, 28, and 30 are oriented at even one-hundred-twenty degree intervals about the central axis 24.

Figure 3:
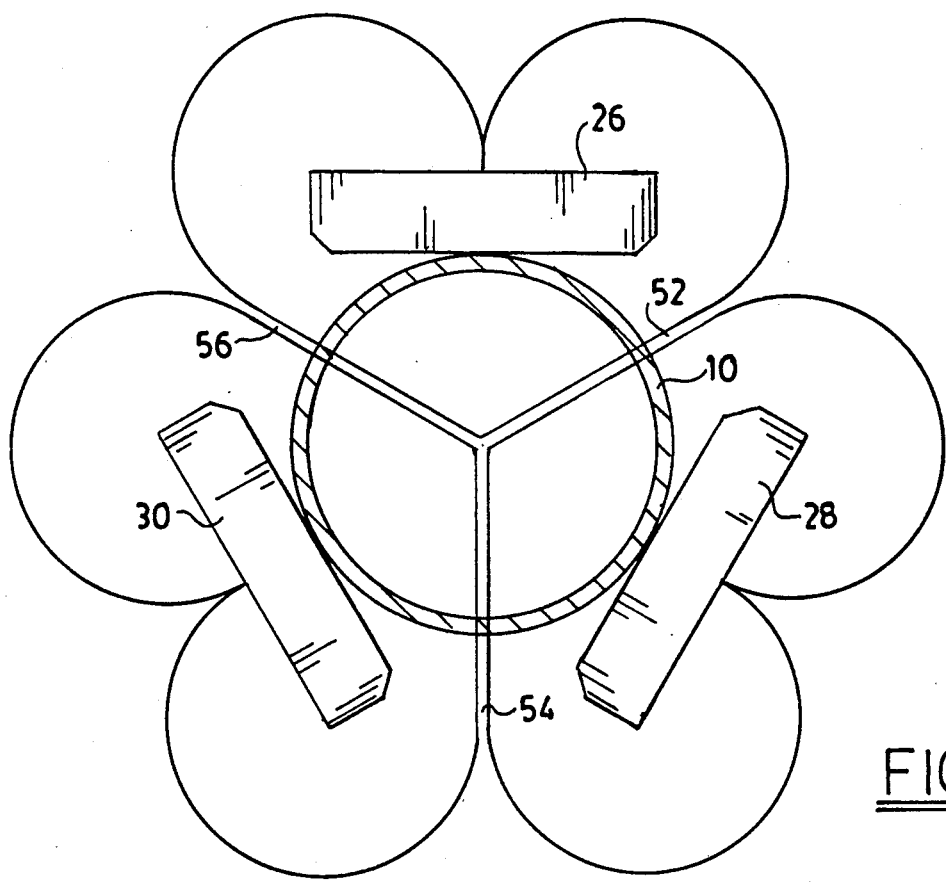
FIG. 3 is a diagram of the cross-sectional view of FIG. 2 showing magnetic field boundaries concentrated within the conduit.

FIG. 3 is a diagram showing field boundaries 52, 54, and 56 of the respective magnets 26, 28, and 30 in the transverse plane 50. The field boundaries 52, 54, and 56 are compressed within a space between the magnets, producing focused magnetic fields within the conduit 10. However, the magnetic fields do not exhibit uniform intensity within the conduit. Field lines of the magnetic fields are more highly concentrated near the field boundaries 52, 54, and 56.

Figures 4, 5:
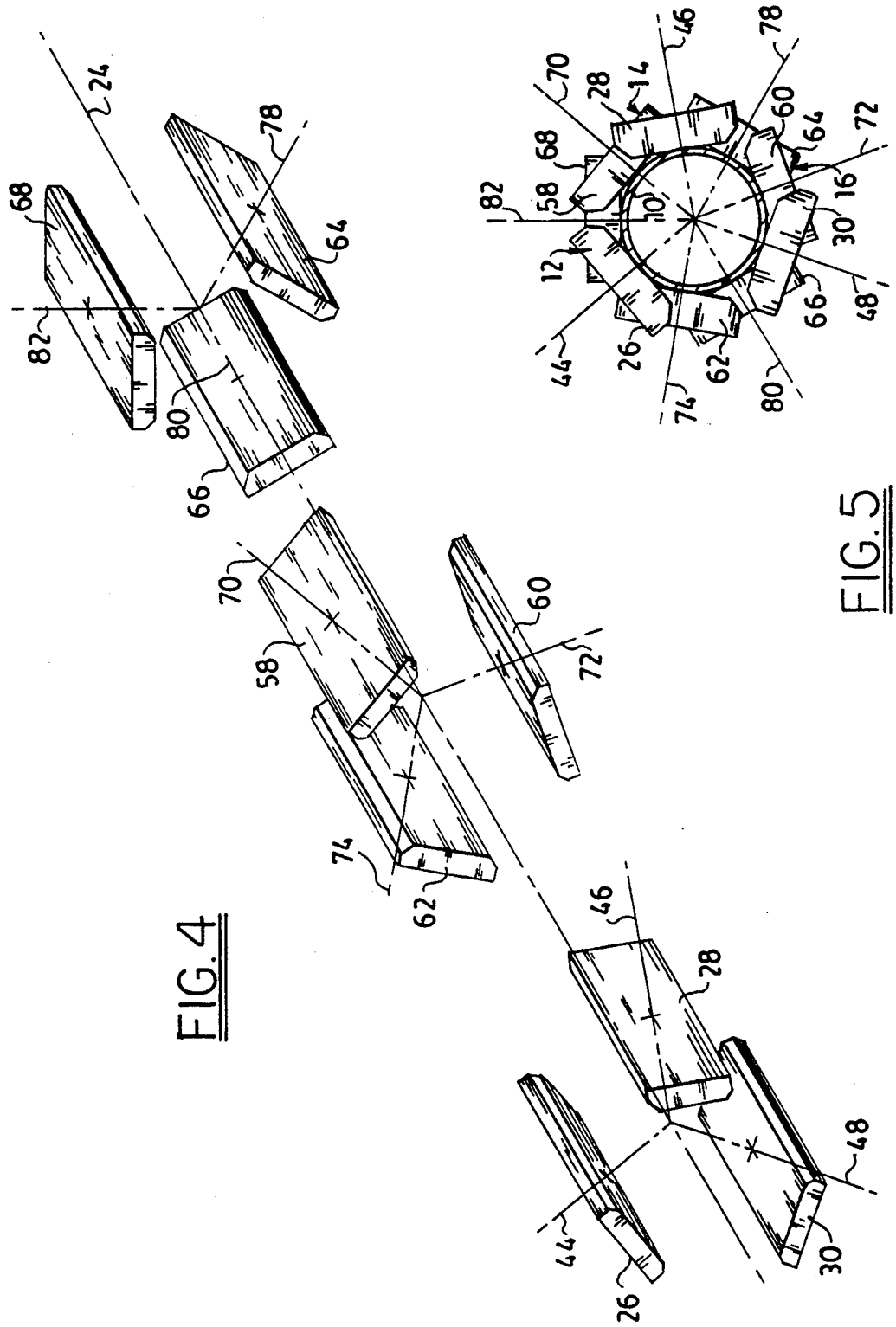
FIG. 4 is a diagram of the three groups of magnets in a perspective view with radial lines indicating relative orientations of individual magnets about a central axis.
FIG. 5 is a diagram of an end view of the individual magnets and radial lines taken along the central axis.

The other two groups of magnets 14 and 16 produce similarly concentrated magnetic fields. However, all three groups of magnets 12, 14, and 16 are indexed with respect to each other along the length of conduit 10 to expose fluid flowing through the conduit to a more uniform amount of magnetic field energy. FIG. 4 shows the three groups of magnets 12, 14, and 16 indexed by even amounts about the central axis 24 along the length of the conduit. In addition to the magnets previously identified in group 12, group 14 includes bar magnets 58, 60, and 62, and group 16 includes bar magnets 64, 66, and 68.

Opposite magnetic poles of the bar magnets 58, 60, and 62 of group 14 are aligned with respective radial lines 70, 72, and 74 within transverse plane 76, and the magnets 64, 66, and 68 of group 16 have opposite magnetic poles aligned with respective radial lines 78, 80, and 82 within transverse plane 84. Similar to the magnetic poles of the magnets in group 12, the magnetic poles of the magnets in groups 14 and 16 are arranged with like magnetic poles (i.e., south poles) facing toward the central axis 24.

Also, similar to group 12, the radial lines of the magnets in groups 14 and 16 are spaced apart angularly about the central axis 24 within the respective transverse planes 76 and 84 by one-hundred-twenty degree intervals. However, the radial lines in each of the three transverse planes 50, 76, and 84 are indexed with respect to each other about the central axis 24. In the view of FIG. 5, the nine radial lines, which are evenly distributed between the three transverse planes 50, 76, and 84, angularly divide space about the central axis 24 into equal increments of forty degrees.

Although our magnetic conditioner is depicted in FIGS. 1-5 with three groups of magnets indexed forty degrees with respect to each other about the central axis, four or more groups of magnets can also be used to angularly divide space about the central axis into increments of thirty degrees or less. In addition, the conduit can be made with flat sides for mounting the magnets in predetermined positions.

Figure 6:
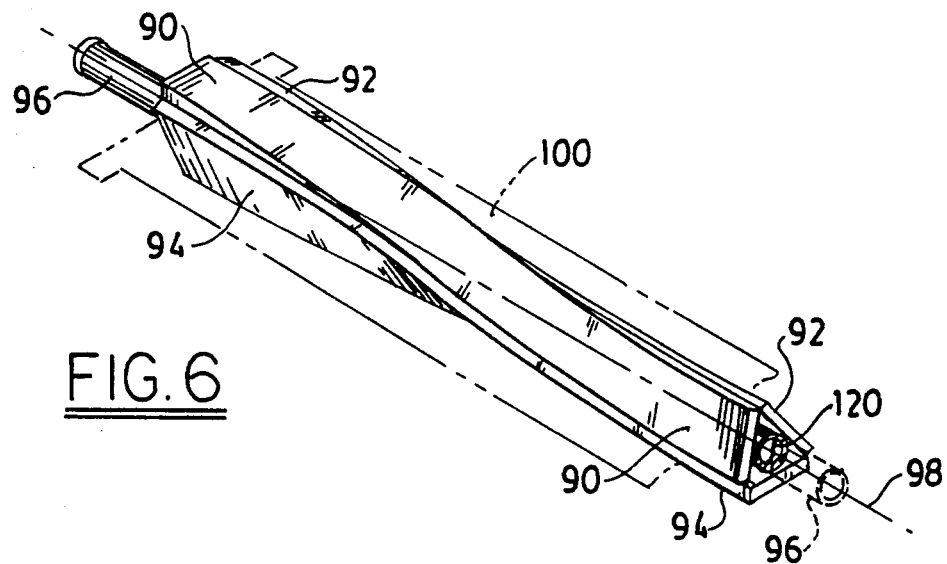
FIG. 6 is a partly cut-away perspective view of an alternative embodiment of our magnetic conditioner having three elongated magnets arranged in contiguous spiral patterns about a conduit.
Figure 7:
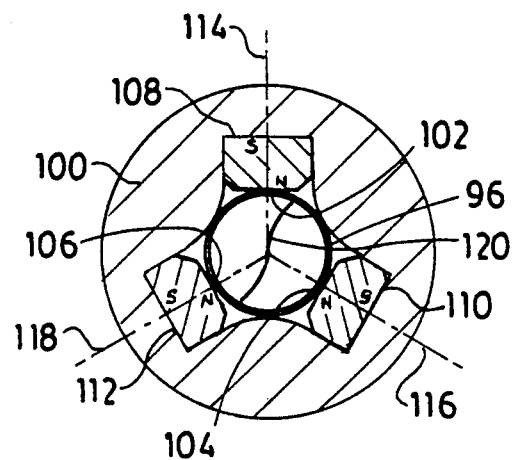
FIG. 7 is a cross-sectional view in a transverse plane through the alternative magnetic conditioner.

An alternative arrangement for exposing fluid to a more uniform amount of magnetic energy is depicted in FIGS. 6 and 7, where elongated bar magnets 90, 92, and 94 are twisted together in helical shapes about a conduit 96. In particular, each of the elongated magnets 90, 92, and 94 is twisted along its length through approximately one-hundred-twenty degrees about a central axis 98 of the conduit 96. A casing 100, similar to the forementioned casing 22, encapsulates the three elongated magnets 90, 92, and 94 in place against the conduit 96.

Although the elongated magnets 90, 92, and 94 are twisted about the central axis 98, the elongated magnets appear similar to the forementioned bar magnets of the previous embodiment when viewed in a transverse plane, such as the plane of FIG. 7. For example, the elongated magnets 90, 92, and 94 include like pole faces 102, 104, and 106 located next to the conduit 96 and opposite like pole faces 108, 110, and 112 located away from the conduit. Respective north and south magnetic poles, indicated as "N" and "S", are located on radial lines 114, 116, and 118 that extend from the central axis 98 of the conduit.

However, in contrast to the preceding embodiment, the north magnetic poles face toward the conduit 96 and the south magnetic poles face away from the conduit. The choice of facing the respective poles toward or away from the conduit depends upon the type of fluid to be treated by our magnetic conditioner. For example, south poles are arranged to face the conduit to enhance combustion of fuels or to promote growth of plant life, whereas north poles face the conduit to inhibit formation of deposits from aqueous fluids.

The radial lines 114, 116, and 118 are separated angularly about the central axis 98 by intervals of one-hundred-twenty degrees. A different set of radial lines separated by one-hundred-twenty degree intervals is defined in each transverse plane along the length of the conduit 96. However, the sets of radial lines are progressively indexed about the central axis 98 through approximately one-hundred-twenty degrees along the entire lengths of the elongated magnets 90, 92, and 94 to expose the fluid passing through the conduit 96 to more uniform amounts of magnetic energy.

The conduits 10 and 96 of the two previously described embodiments can also be fitted with respective baffles 86 and 120 or similar means to promote helical circulations of fluid within the conduits. The helical circulations of fluid are used to improve efficiencies of the magnetic conditioners by directing the fluid across more lines of magnetic force and by crossing the lines of magnetic force at angles more closely approaching ninety degrees.

Figure 8:
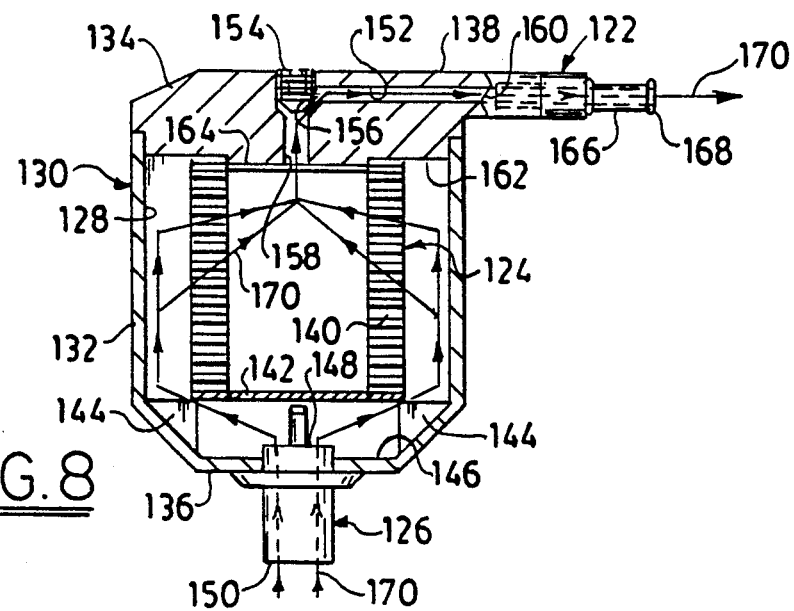
FIG. 8 is a partly cut-away view showing a magnetic conditioner as a part of a novel emission control system.

FIG. 8 shows a unique application of our magnetic conditioner as part of an emission control system for treating so-called "blow by" gases of an internal combustion engine before returning the gases to an intake manifold of the engine. For example, a magnetic conditioner 122 is assembled as a part of a treatment device that also includes a coalescing filter 124 and a PCV valve 126 (i.e., a positive crankcase ventilation valve). The coalescing filter 124 is mounted within a cavity 128 of a housing 130 that also includes a main body 132 and a removable cap 134. The PCV valve 126 connects to a bottom part 136 of the main body 132, and the magnetic conditioner 122 connects to an extended portion 138 of the removable cap 134.

The main body 132 and removable cap 134 of the housing are preferably made as aluminum castings. However, other materials including injection molded resins could also be used to make these housing parts. The coalescing filter 124 has an annular shape and includes a filter medium 140 similar to filters used in air compressors to separate oil lubricating the compressor pump from the air discharged by the pump. A bottom portion 142 of the coalescing filter 124 is closed to prevent fumes 170 from entering the interior space of the filter without passing through the filter medium 140. A number of feet 144 project into the housing cavity 128 to support the bottom portion 142 of the coalescing filter at a predetermined distance above a bottom 146 of the cavity 128.

The PCV valve 126 is of conventional construction and is sized to accommodate a maximum desired flow rate of the fumes 170 through the coalescing filter 124 and the magnetic conditioner 122. A top end 148 of the PCV valve 126 is mounted on the bottom part 136 of the main body and projects through the bottom 146 of the housing cavity. A bottom end 150 of the PCV valve is arranged to be connected to an engine crankcase (not shown) in a conventional manner.

The removable cap 134 includes an "L-shaped" passageway 152 interrupted by an adjustable screw 154 that controls the size of a flow-restricting orifice 156 within the passageway. An inlet 158 of the passageway 152 is in open communication with the interior space of the coalescing filter 124, and an outlet 160 of the passageway 152 is connected to the magnetic conditioner 122. A bottom part 162 of the removable cap 134 is sealed against a top portion 164 of the coalescing filter 124 to prevent the fumes 170 from entering the inlet 158 of the passageway through the cap without passing through the filter medium 140. The removable cap 134 can be secured to the main body 132 by any number of conventional securing arrangements including threaded connections, clamps, latches, screws, or snap-fit fasteners. In addition, conventional seals or gaskets are preferably used to seal the main body 132 and the removable end cap 134 to prevent escape of the fumes 170 from the housing 130.

The magnetic conditioner 122 can be configured in accordance with either of the above-described embodiments in FIGS. 1-5 or FIGS. 6 and 7. However, other magnetic conditioners for enhancing combustion of hydrocarbon fuels could also be used, including the magnetic conditioner disclosed in U.S. Pat. No. 4,568,901 to one of the joint inventors named herein. The disclosure of this patent is hereby incorporated by reference in its entirety. One end of a conduit 166 passing through the magnetic conditioner 122 is connected to the outlet 160 of the "L-shaped" passageway, and the other end of the conduit 166 includes a conventional fitting 168 for connecting the conduit 166 to the intake system of the engine.

The fumes 170 from unburned fuel that leak through sealing rings of combustion chambers in the engine are drawn out of the engine crankcase through the PCV valve 126 by a vacuum in the intake system created by operation of the engine. The rate at which the fumes 170 pass through the PCV valve is controlled not only by the PCV valve itself but also by the adjustment screw 154 that controls the size of the flow-restricting orifice 156 to adapt the emission control system to different size engines.

Oil and other contaminants carried by the fumes 170 from the engine crankcase are trapped in the filter medium 140 of the coalescing filter and are prevented from entering the intake system of the engine. However, the unburned gasoline portion of the fumes 170 passes through the coalescing filter 124 and is treated magnetically by the magnetic conditioner 122 for enhancing combustion characteristics of the fumes 170 before admitting the fumes into the engine intake system. The two steps of separating contaminants from the fumes 170 and magnetically treating the fumes are intended to provide for more complete combustion of the fumes within the engine and for a reduction in harmful emissions from the engine.

When the engine is not running or vacuum pressure is low, oil separated by the coalescing filter 124 is allowed to collect in the bottom 146 of the housing cavity. Any of the oil that rises above the top end 148 of the PCV valve is allowed to drain through the valve to the engine crankcase. Thus, the amount of oil that is allowed to accumulate in the housing cavity 128 is limited by the top end of the PCV valve—the excess oil being returned to the crankcase. The feet 144 support the bottom portion 142 of the coalescing filter above the top end 148 of the PCV valve to prevent the coalescing filter 124 from being immersed in the oil.

Although the coalescing filter 124 may eventually become clogged with contaminants and require replacement, the provision of returning the separated oil to the crankcase is expected to extend the useful life of the filter. However, if replacement becomes necessary, the coalescing filter can be readily accessed by removing the cap 134 from the main body 132 of the housing.

We claim:

1. A device for magnetically treating a fluid comprising:

a conduit for conveying fluid having a central axis and a length that extends along said central axis;

a plurality of magnets mounted about said central axis;

said magnets having opposite magnetic poles aligned with radial lines extending from said central axis and having like magnetic poles facing toward said central axis; and said radial lines along which said opposite magnetic poles are aligned varying angularly about said central axis along said length of the conduit for exposing fluid flowing through said conduit to a more uniform amount of magnetic field energy.

2. The device of claim 1 in which said opposite magnetic poles are spaced at equal angular amounts about said central axis in transverse planes that extend normal to said central axis at respective points along said length of the conduit.

3. The device of claim 2 in which said equally spaced magnetic poles in the transverse planes are angularly indexed with respect to each other along said length of the conduit.

4. The device of claim 3 in which said angular indexing of the equally spaced magnetic poles between transverse planes approximates a helical form.

5. The device of claim 4 in which said conduit includes means for developing a helical circulation of fluid in an angular direction opposite to the helical form approximated by the indexing of the equally spaced poles.

6. The device of claim 2 in which said equally spaced poles are spaced at 120 degree intervals about said central axis.

7. The device of claim 3 in which said magnets are arranged in groups along said length of the conduit, and said equally spaced magnetic poles of a first of said groups are angularly indexed with respect to said equally spaced magnetic poles of a second of said groups.

8. The device of claim 7 in which said equally spaced magnetic poles of a third of said groups are angularly indexed with respect to said equally spaced magnetic poles of the first and second groups.

9. The device of claim 8 in which said equally spaced magnetic poles of the first, second, and third groups intersect portions of a helicoid extending along said length of the conduit.

10. The device of claim 9 in which said conduit includes means for developing a helical circulation of fluid in an angular direction opposite to the helicoid extending along the length of the conduit.

11. The device of claim 7 in which said magnets in each group are mounted at 120 degree intervals about said central axis.

12. A conditioner for treating a fluid affected by passage through magnetic fields comprising:
a conduit made of a nonmagnetic material and having a length along with inner and outer peripheral surfaces that extend along said length;
permanent magnets having opposite magnetic poles, one of said poles common to each of said permanent magnets facing toward said outer peripheral surface of the conduit and the other of said poles common to each of said permanent magnets facing away from said outer peripheral surface of said conduit;
a first group of said permanent magnets arranged about said outer peripheral surface of the conduit at a first position along said length of the conduit;
a second group of said permanent magnets arranged about said outer peripheral surface of the conduit at a second position along said length of the conduit;
said first and second groups of permanent magnets forming respective nonuniform magnetic fields within said conduit at said first and second positions along the length of the conduit; and
said first and second groups of permanent magnets being relatively indexed about said conduit to expose fluid flowing through said conduit to more uniform amounts of magnetic field energy.

13. The conditioner of claim 12 including a third group of permanent magnets which forms a nonuniform magnetic field within said conduit and which is indexed with respect to said first and second groups of permanent magnets.

14. The conditioner of claim 13 in which each of said groups includes three permanent magnets.

15. The conditioner of claim 14 in which said conduit includes means for developing a helical circulation of fluid within said conduit for exposing the fluid to a higher concentration of magnetic energy.

16. The conditioner of claim 12 in which said pole common to each of said permanent magnets that faces toward said outer peripheral surface of the conduit is a south pole.

17. The conditioner of claim 12 in which said pole common to each of said permanent magnets that faces toward said outer peripheral surface of the conduit is a north pole.

18. An emission control system for treating of fumes from a crankcase of an engine before returning the fumes to an intake manifold of the engine for combustion comprising:
a housing;
a filter supported within said housing for separating oil from the fumes;
a positive crankcase ventilation valve connected to said housing;
a magnetic conditioner for treating the fumes to enhance their combustion within the engine including a conduit for conveying fluid having a central axis and a length that extends along said central axis and a plurality of magnets mounted about said central axis;
said magnets having opposite magnetic poles aligned with radial lines extending from said central axis and having like magnetic poles facing toward said central axis; and
said radial lines along which said opposite magnetic poles are aligned vary angularly about said central axis along said length of the conduit for exposing fluid flowing through said conduit to a more uniform amount of magnetic field energy.

19. The system of claim 18 in which said main body of the housing is arranged to collect oil separated from the fumes for returning the oil to the crankcase.

20. The system of claim 19 in which said positive crankcase ventilation valve is arranged to return the collected oil to the crankcase.

21. The system of claim 19 in which a passageway is formed through said removable cap to connect interior space of said housing with said magnetic conditioner.

22. The system of claim 21 in which said passageway includes a flow-restricting orifice for regulating flow rates of the fumes between the crankcase and the intake manifold.

23. The system of claim 22 in which an adjustment screw is used to control a size of said flow-restricting orifice.

* * * * *